(12) United States Patent
Brückner et al.

(10) Patent No.: US 8,217,295 B2
(45) Date of Patent: Jul. 10, 2012

(54) METHOD FOR PRODUCING A WELDED CONNECTION FOR USE IN A CORROSIVE ENVIRONMENT

(75) Inventors: Erhard Brückner, Röttenbach (DE); Gerhard Engelhard, Erlangen (DE); Siegfried Gügel, Möhrendorf (DE)

(73) Assignee: Areva NP GmbH, Erlangen (DE)

( * ) Notice: Subject to any disclaimer, the term of this patent is extended or adjusted under 35 U.S.C. 154(b) by 1144 days.

(21) Appl. No.: 11/931,558

(22) Filed: Oct. 31, 2007

(65) Prior Publication Data
US 2008/0054050 A1 Mar. 6, 2008

Related U.S. Application Data

(63) Continuation of application No. PCT/EP2006/004701, filed on May 18, 2006.

(30) Foreign Application Priority Data

Jul. 29, 2005 (DE) .......................... 10 2005 035 585

(51) Int. Cl.
B23K 9/23 (2006.01)
B23K 33/00 (2006.01)
(52) U.S. Cl. ................ 219/61; 219/59.1; 219/137 WM; 219/146.23
(58) Field of Classification Search .................. 219/59.1, 219/60 A, 60 R, 61.1, 61.11, 61.12, 61.13, 219/137 WM, 146.23; 148/426, 516, 519, 148/521; 420/441, 459; 228/159, 160, 164, 228/165, 166, 167, 168, 169, 170, 171, 172, 228/173.4, 173.6, 262.3, 262.4, 262.41
See application file for complete search history.

(56) References Cited

U.S. PATENT DOCUMENTS 3,328,557 A * 6/1967 Rogers et al. ............ 219/146.52
4,525,620 A * 6/1985 Deverell et al. ....... 219/137 WM
(Continued)

FOREIGN PATENT DOCUMENTS

AT 189209 3/1957
(Continued)

OTHER PUBLICATIONS

Anik et al.: "Metallphysikalische Vorgänge beim Schweiβen" ("Metal-physical processes during welding"), Mar. 1992.

*Primary Examiner* — Geoffrey S Evans
(74) *Attorney, Agent, or Firm* — Laurence A. Greenberg; Werner H. Stemer; Ralph E. Locher

(57) ABSTRACT

A method produces a welded connection between first and second components each having inner and outer sides interconnected by an end face. The first component has a ferritic basic body carrying a plating at the inside and having an end face with a buffer layer of Ni-based alloy. The second component is of austenitic material. The end faces of the components enclose a weld groove. An austenitic root, connecting the plating to the end face of the second component, is welded in the weld groove. An intermediate layer of a nickel alloy having at least 90% nickel is welded onto the root. The intermediate layer is connected to the end faces of the plating and the second component. A weld seam is then produced in the remaining weld groove using a nickel-based welding additive. A method for repairing a welded connection between first and second components is also provided.

9 Claims, 10 Drawing Sheets

U.S. PATENT DOCUMENTS

| | | | |
|---|---|---|---|
| 4,556,240 A * | 12/1985 | Yoshida | 228/262.3 |
| 5,347,098 A * | 9/1994 | Murakami et al. | 219/61 |
| 6,193,145 B1 | 2/2001 | Fournier et al. | |
| 2002/0179583 A1 * | 12/2002 | Copeland et al. | 219/137 WM |
| 2006/0086708 A1 * | 4/2006 | Coleman et al. | 219/137 WM |

FOREIGN PATENT DOCUMENTS

| | | |
|---|---|---|
| DE | 199 53 079 A1 | 5/2001 |
| FR | 2 723 869 | 3/1996 |
| FR | 2 799 401 | 4/2001 |
| JP | 01197073 | 8/1989 |
| JP | 1197073 A | 8/1989 |
| JP | 8267248 A | 10/1996 |
| JP | 11315973 | 11/1999 |
| WO | WO 9722433 A1 * | 6/1997 |

* cited by examiner

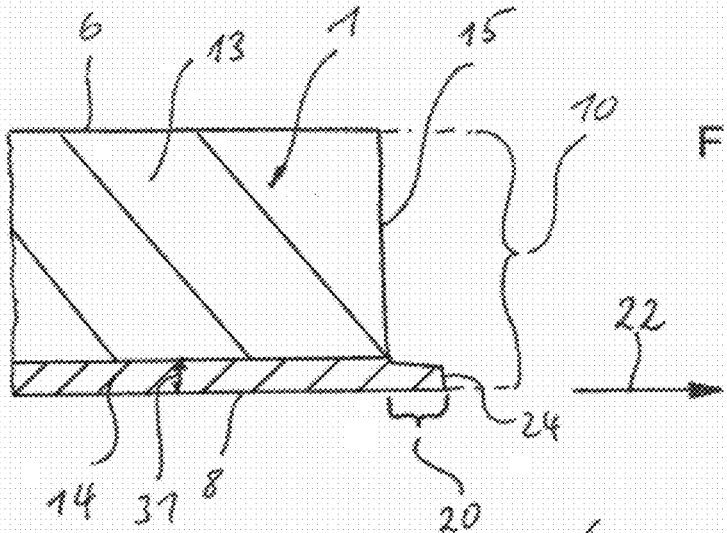
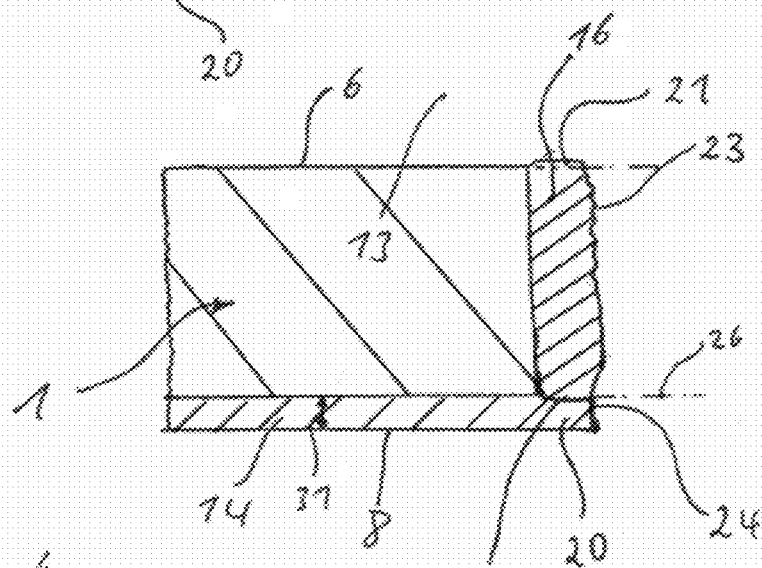
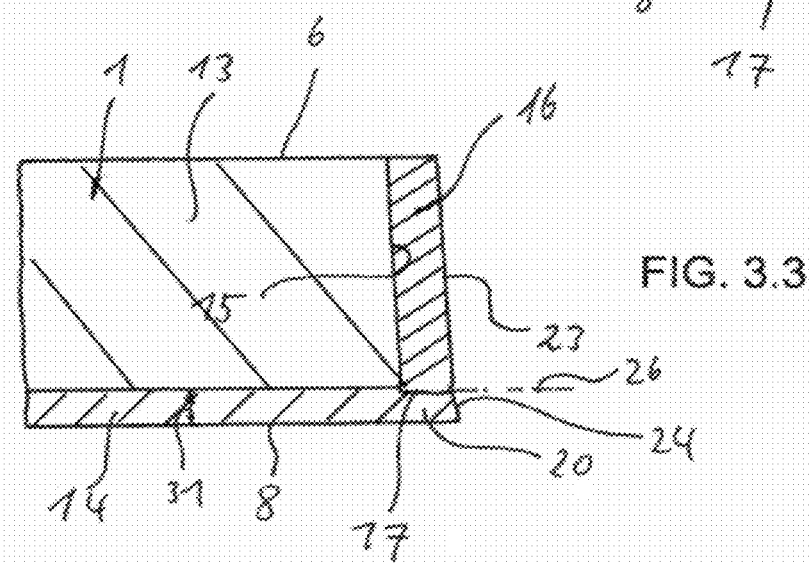

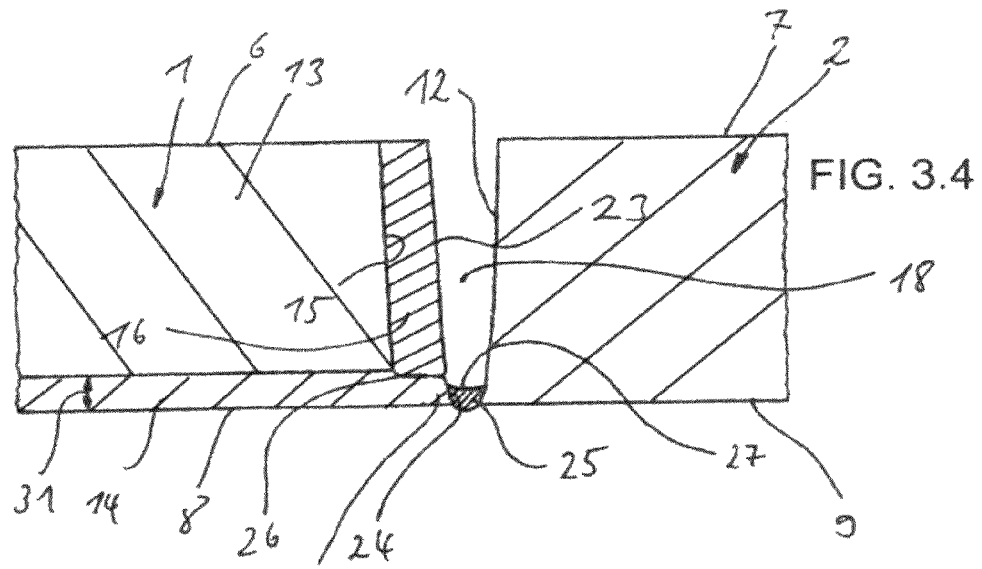
FIG. 3.4
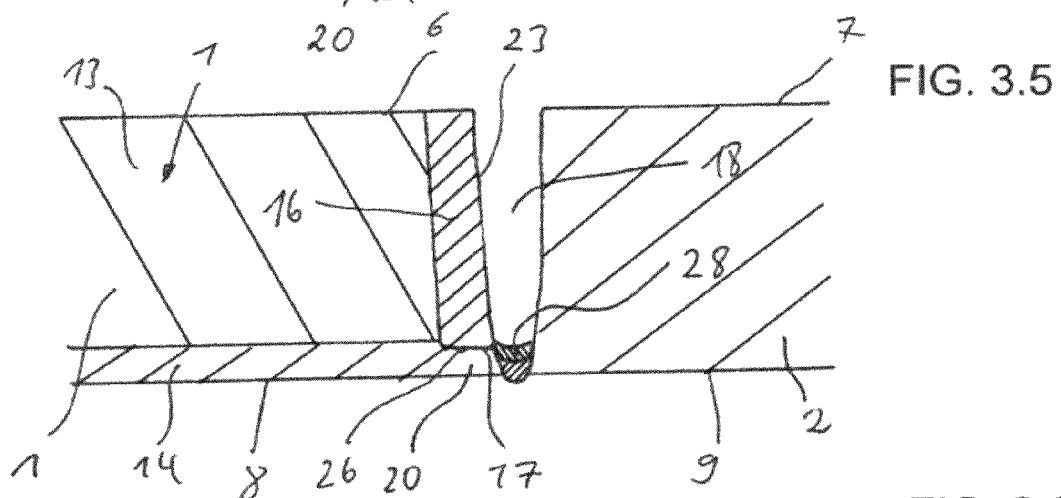
FIG. 3.5
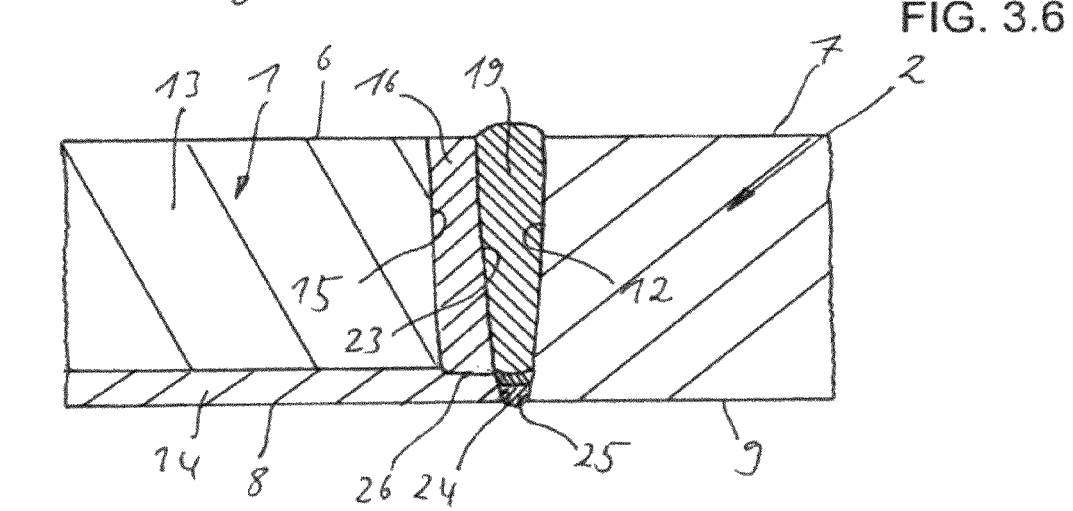
FIG. 3.6

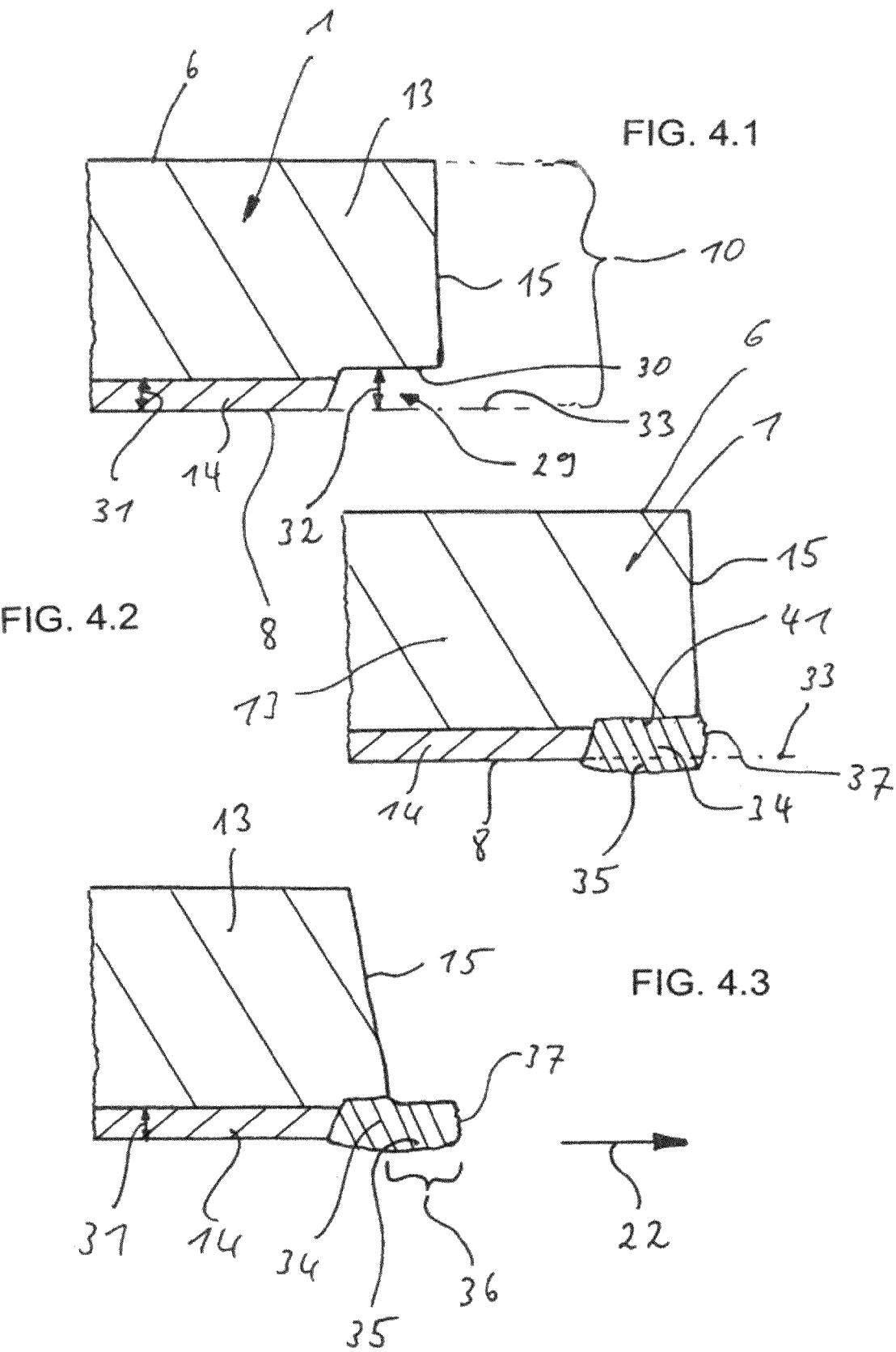

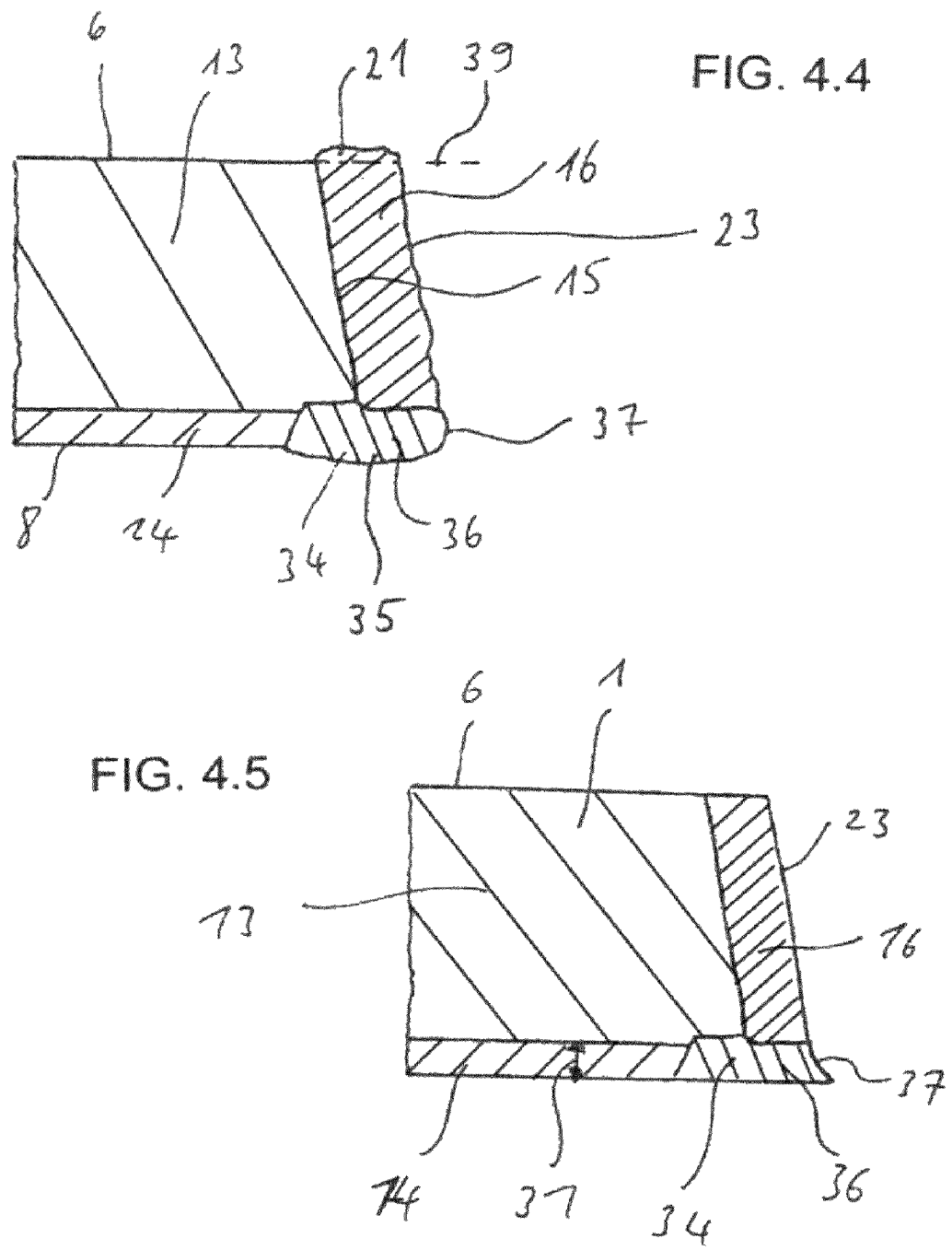

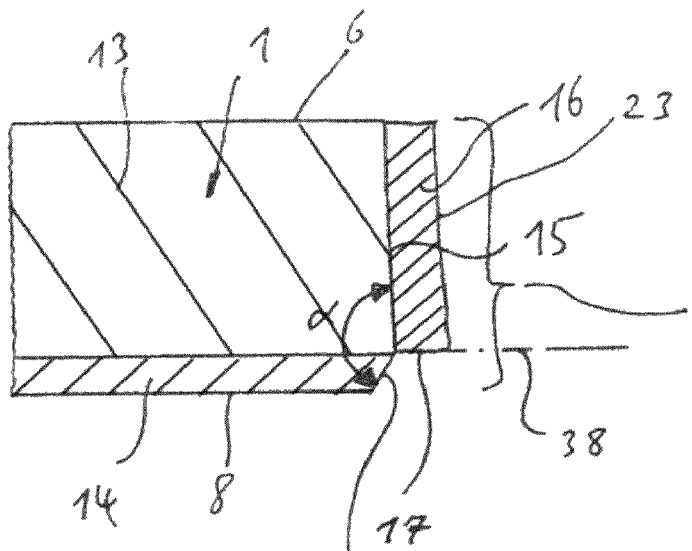
FIG. 5.1
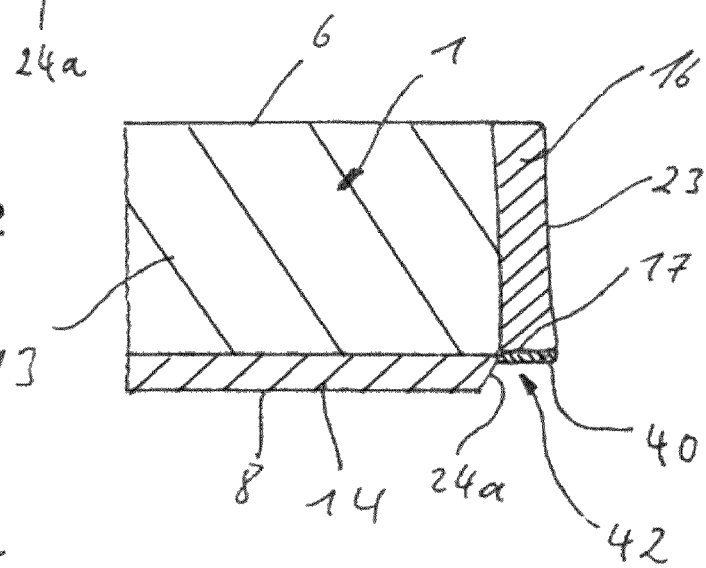
FIG. 5.2
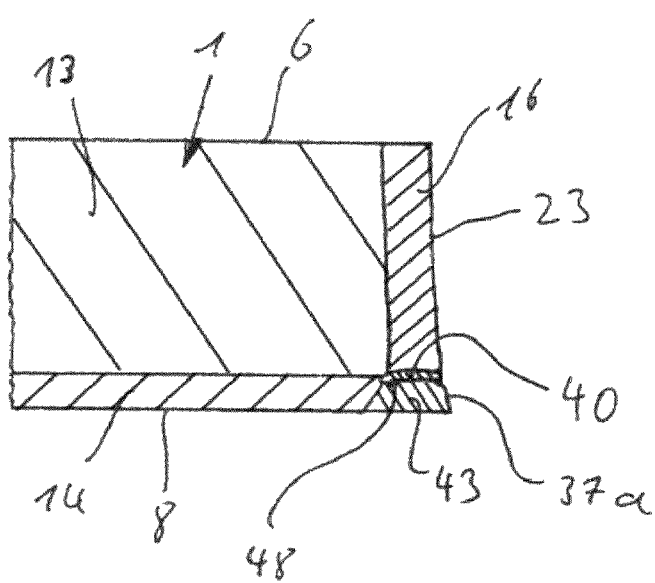
FIG. 5.3

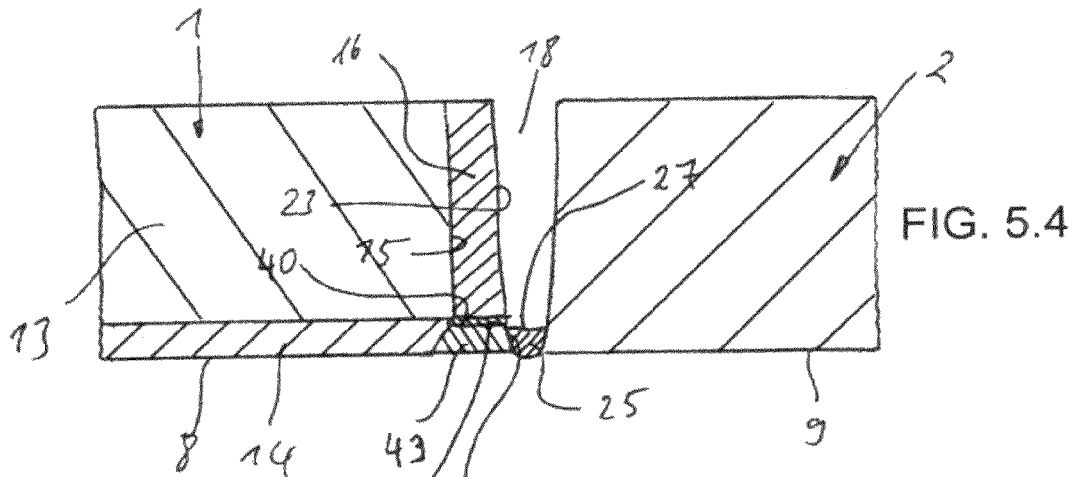
FIG. 5.4
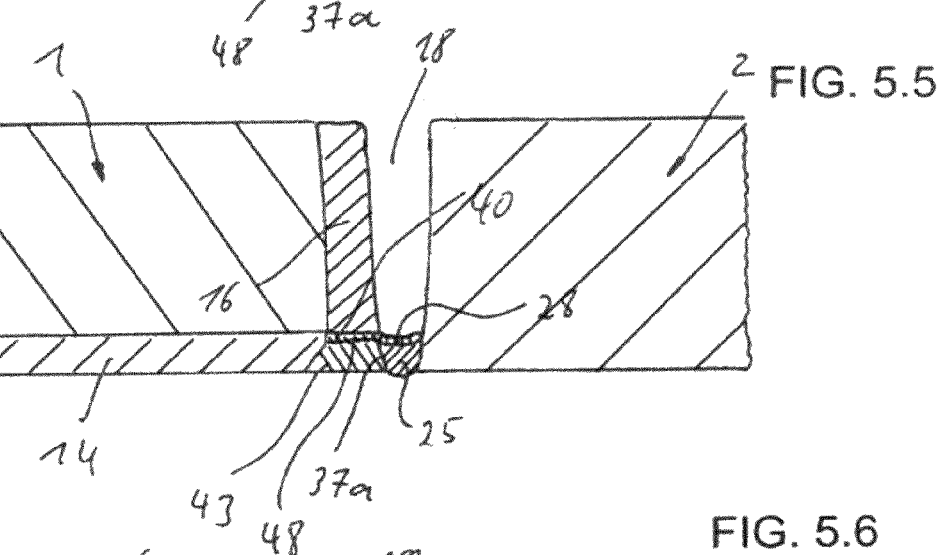
FIG. 5.5
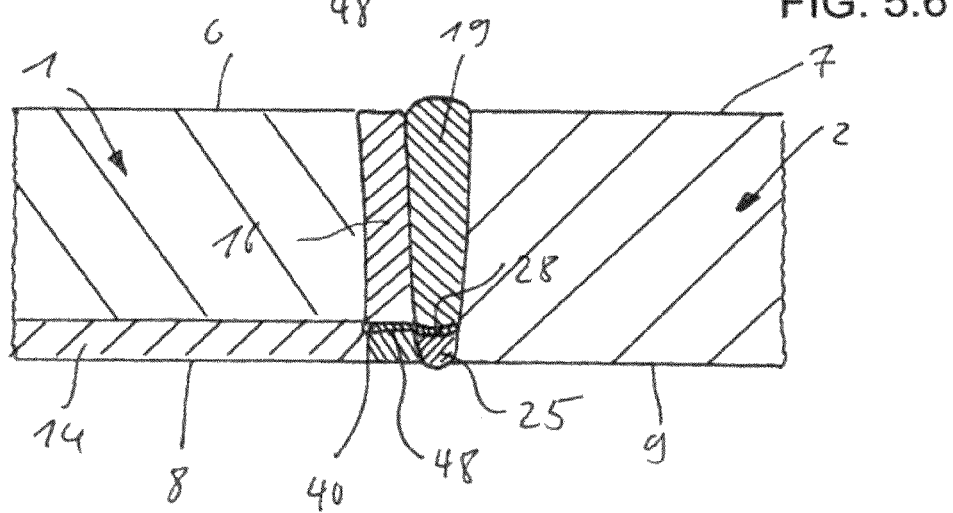
FIG. 5.6

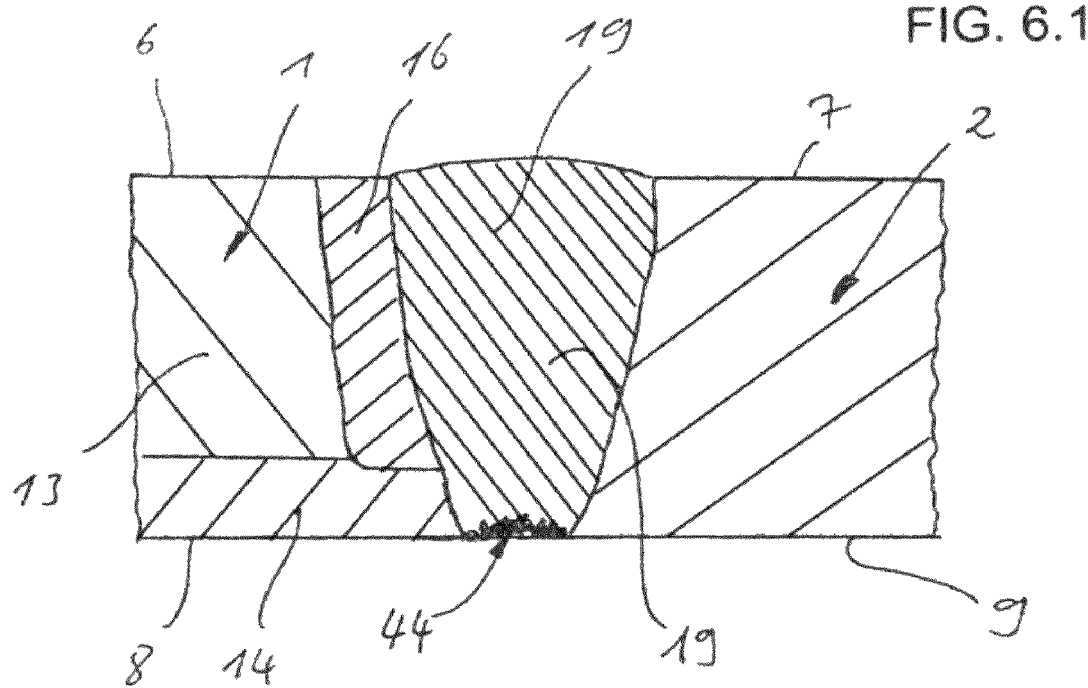
FIG. 6.1
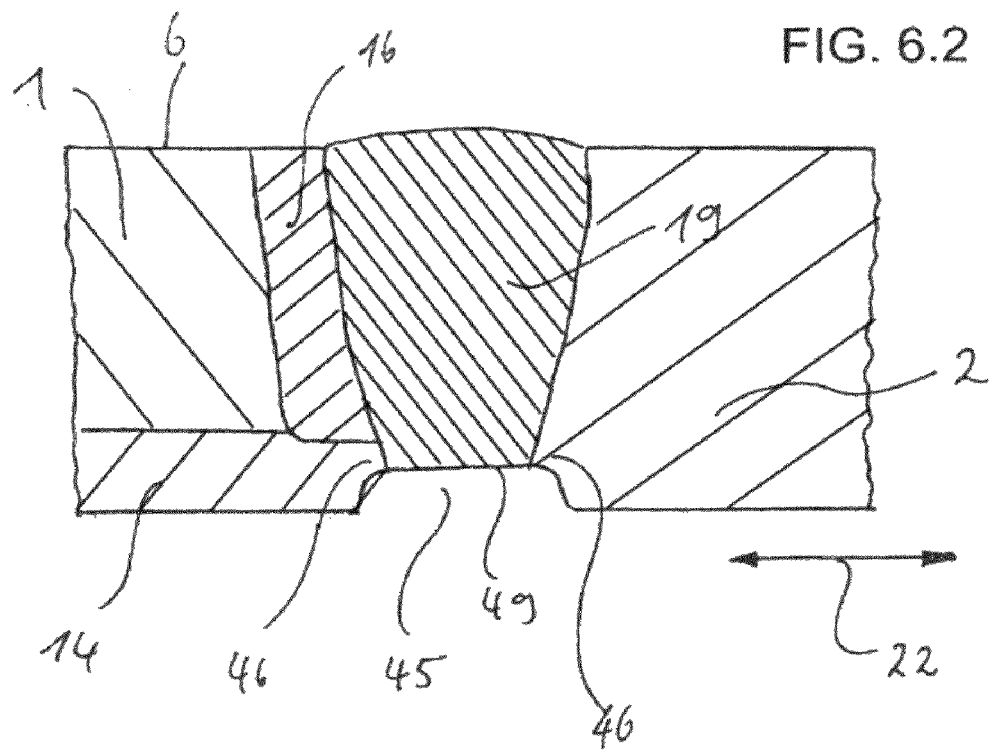
FIG. 6.2

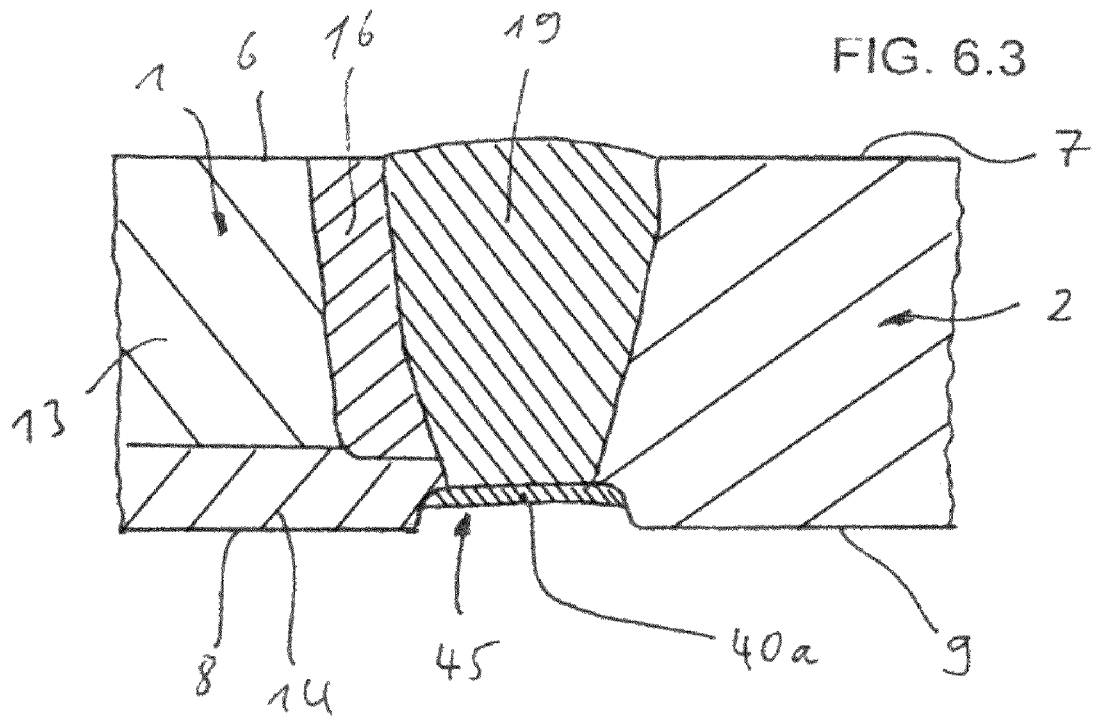
FIG. 6.3
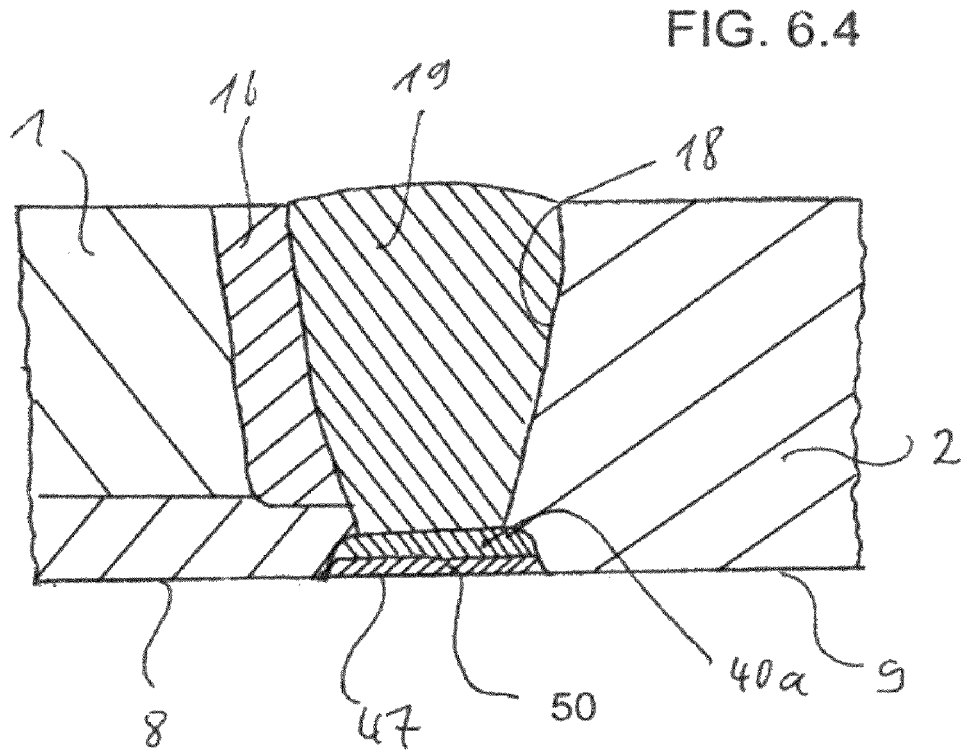
FIG. 6.4

METHOD FOR PRODUCING A WELDED CONNECTION FOR USE IN A CORROSIVE ENVIRONMENT

CROSS-REFERENCE TO RELATED APPLICATIONS

This is a continuation, under 35 U.S.C. §120, of copending International Application No. PCT/EP2006/004701, filed May 18, 2006, which designated the United States; this application also claims the priority, under 35 U.S.C. §119, of German Patent Application DE 10 2005 035 585.4, filed Jul. 29, 2005; the prior applications are herewith incorporated by reference in their entirety.

BACKGROUND OF THE INVENTION

Field of the Invention

The invention relates to a method for producing a welded connection between first and second components each having an inside, an outside and an end face interconnecting the inside and the outside. The first component is formed from a ferritic basic body that carries an inside plating and has an end face which is provided with a buffer layer formed of a nickel-based alloy. The second component is formed from an austenitic material. The invention furthermore relates to a method for repairing such a welded connection.

The components in question are, in particular, pipes or pipe connection pieces, the insides of which come into contact with a corrosive medium. In particular, the primary circuit of a nuclear power station is to be mentioned in this case, in which water that is under pressure and has high temperatures circulates as the primary coolant. In order to avoid corrosion phenomena in the reactor pressure vessel which is formed of a ferritic material for reasons of strength, it is provided on the inside with a plating formed of an austenitic material. A pipeline connected to the connection piece of a reactor pressure vessel, by contrast, may be formed entirely of more corrosion-resistant austenitic material. Two components of the type initially mentioned, or a ferritic pipe section with an austenitic inner plating and a fully austenitic pipe section, are connected to one another in a customary procedure through the use of a weld seam formed of a nickel-based alloy. The disadvantage thereof is that specific nickel-based alloys have lower corrosion resistance (intercrystalline stress cracking corrosion) than austenitic materials so that, in the event of lengthy contact with a corrosive medium, for example with water, while a nuclear reactor is in operation, there is the risk of the weld seam corroding from the inside.

SUMMARY OF THE INVENTION

It is accordingly an object of the invention to provide a method for producing a more corrosion-resistant welded connection and a method for repairing a corrosion-damaged welded connection, which overcome the hereinafore-mentioned disadvantages of the heretofore-known methods of this general type.

With the foregoing and other objects in view there is provided, in accordance with the invention, a method for producing a welded connection between first and second components each having a respective inside, outside and end face interconnecting the inside and the outside. The first component is formed of a ferritic basic body carrying an inside plating and having an end face provided with a buffer layer formed of a nickel-based alloy. The second component is formed of an austenitic material. The method comprises enclosing a weld groove between the end faces of the two components. The plating is connected to the end face of the second component with a root formed of an austenitic material welded in the weld groove. An intermediate layer formed of a nickel alloy with at least 90% nickel is welded onto the root and the intermediate layer is connected to an end face of the plating and to the end face of the second component. A weld seam is subsequently generated with a nickel-based welding additive in the weld groove still remaining.

With the objects of the invention in view, there is concomitantly provided a method for repairing a welded connection between first and second components each having a respective inside, outside and end face interconnecting the inside and the outside. The first component is formed of a ferritic basic body with an inside plating formed of an austenitic material and an end face carrying a buffer layer formed of a nickel-based alloy. A weld seam formed of a nickel-based welding additive interconnects the end faces of the first and second components. The method comprises stripping off a weld region between the two components on a side of the plating to form a recess having a bottom. An intermediate layer, formed of an alloy weldable both to the nickel-based alloy of the buffer layer and to an austenitic material, is welded into the recess to partially fill the recess and completely cover the bottom of the recess. A closing layer formed of austenitic material is welded onto the intermediate layer to cover an entire area of the intermediate layer. The closing layer is smoothed by cutting machining.

Other features which are considered as characteristic for the invention are set forth in the appended claims.

Although the invention is illustrated and described herein as embodied in a method for producing a welded connection and a method for repairing a welded connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 3.1-3.6 are fragmentary, longitudinal-sectional views illustrating a sequence of a first method variant for producing a welded connection;

FIGS. 4.1-4.5 are fragmentary, longitudinal-sectional views illustrating a sequence of a second method variant;

FIGS. 5.1-5.6 are fragmentary, longitudinal-sectional views illustrating a sequence of a third method variant; and FIGS. 6.1-6.4 are fragmentary, longitudinal-sectional views illustrating a sequence of a method for repairing a conventional welded connection.

DETAILED DESCRIPTION OF THE INVENTION

Figure 1:
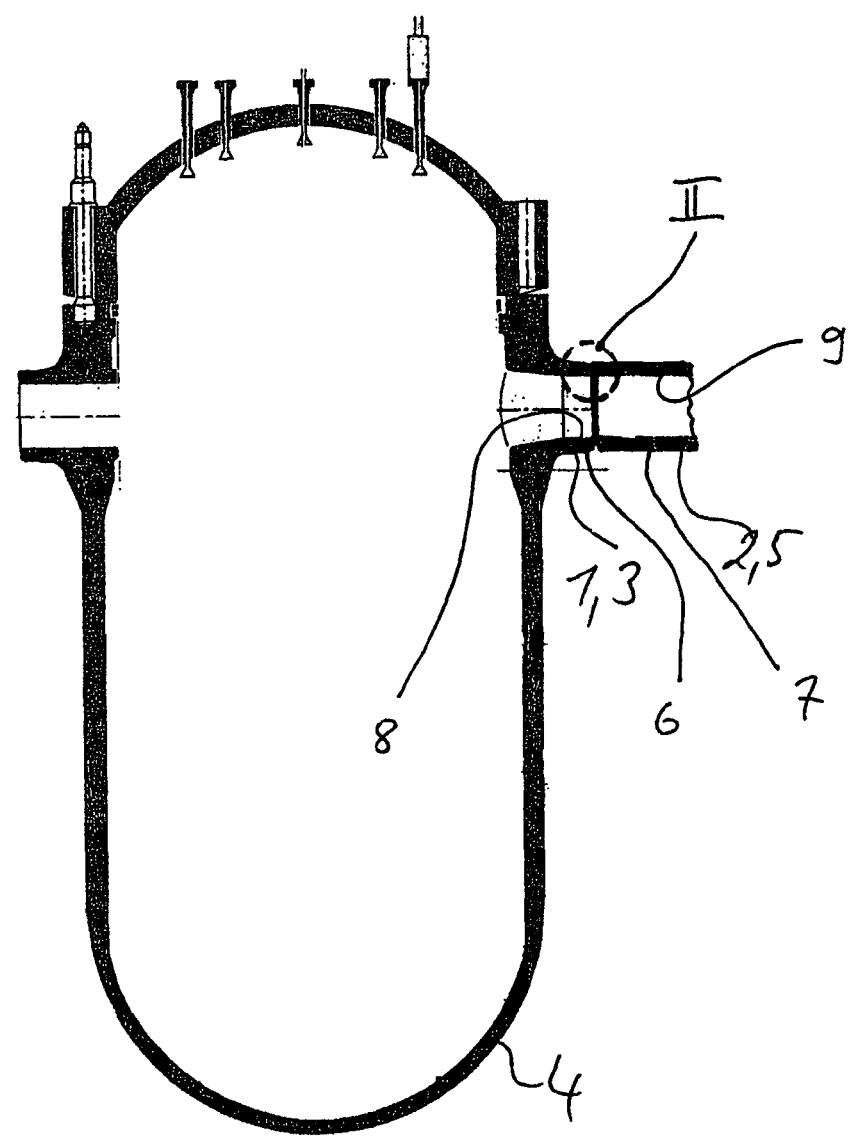
FIG. 1 is a diagrammatic, longitudinal-sectional view of a reactor pressure vessel with a connection piece and with a pipe connected thereto.
Figure 2:
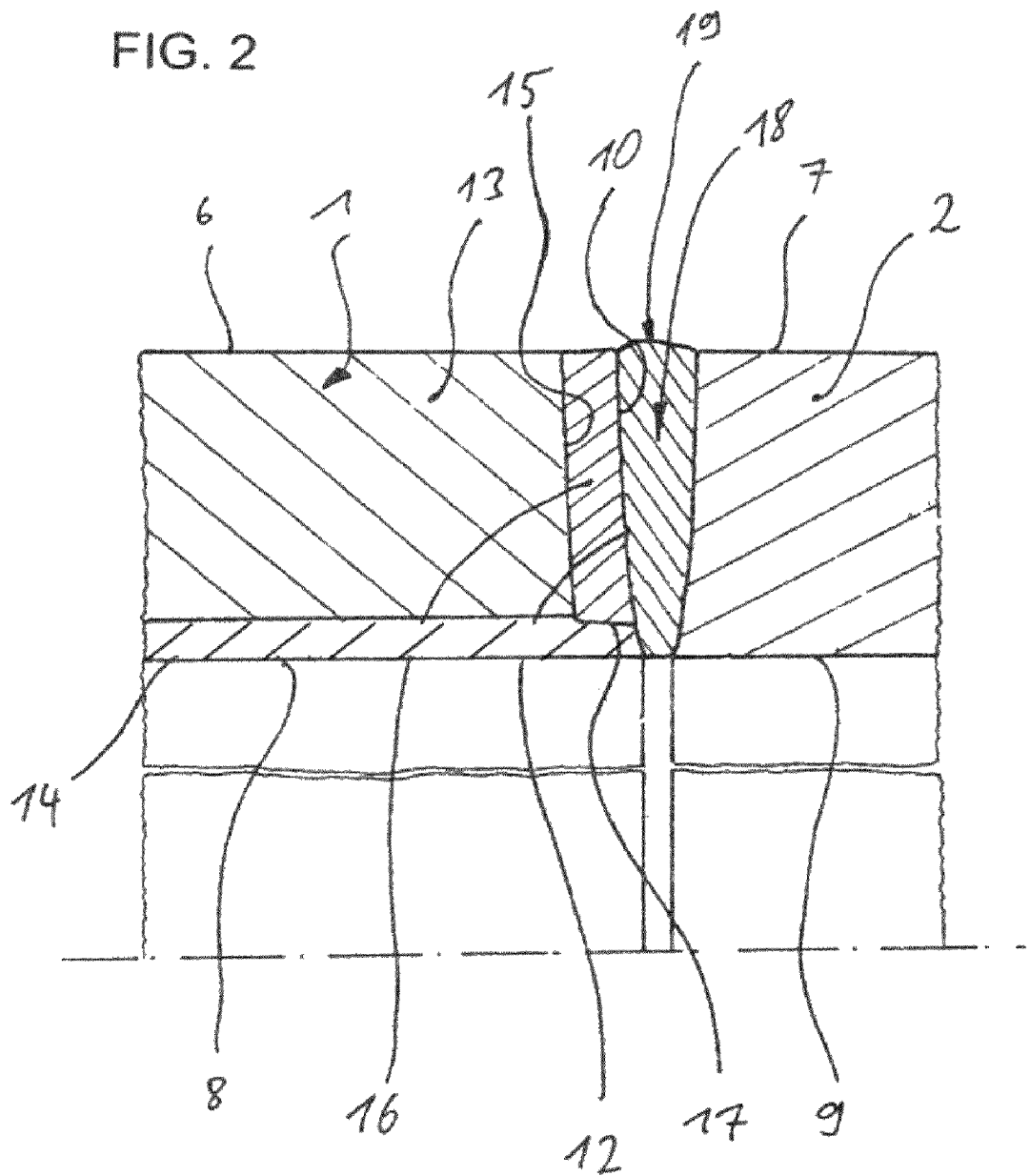
FIG. 2 is an enlarged, fragmentary, longitudinal-sectional view of a portion II of FIG. 1, showing a conventional welded connection between the connection piece and the pipe.

Referring now to the figures of the drawings in detail and first, particularly, to FIGS. 1 and 2 thereof, it is seen that FIG.

2 shows a conventional welded connection between a first component 1 and a second component 2, in which the first component 1 is, in particular, a pipe section, for example a connection piece 3 of a reactor pressure vessel 4, and the component 2 is a pipe 5 attached butt to butt thereto, as is seen in FIG. 1. The components 1, 2 each have a respective outside 6, 7, a respective inside 8, 9 and a respective end face 10, 12 connecting the outside and inside to one another. The first component 1 is composed of a basic body 13 and of a plating 14 attached to the latter on the inside. The basic body 13 is formed of a ferritic material, for example of 22 NiMoCr 37 (material number 1.6751) or SA 508 Cl 2 (ASME code). The plating 14 is formed of an austenitic material, for example material number 1.4551 or AISI 347. An end face 15 of the basic body 13 carries a buffer layer 16 formed of a nickel-based alloy, for example Inconel® 182 (DIN 1736 EL-NICr15FeMn or ISO ENi6182), with a nickel content higher than 67%, containing alloying constituents being, inter alia, 16% chromium, 6.5% manganese and 6% iron (the percentages in this case and elsewhere herein are percentages by weight). The buffer layer 16 covers the entire end face 15 of the basic body 13. An inward-facing narrow side 17 of the buffer layer 16 is connected to the plating 14 in a materially integral manner. The second component 2 is formed of an austenitic material, for example of X 10 CrNiMoTi 1810 (1.4571) or AISI 316 L. The two components 1, 2 are oriented in alignment with one another with an axial clearance, and between them they enclose a weld groove 18 and a weld seam 19. The weld seam 19 is generated with a nickel-based alloy as a welding additive, for example 182. It extends as far as the inside 8, 9 of the first and second components 1, 2 and is exposed there to the corrosive influences of the medium in contact therewith, in particular of a primary coolant which is under high pressure and has high temperatures of more than 280° C. Nickel-based alloys have a comparatively low corrosion resistance, so that corrosion may occur from the inside in the region of the weld seam 19. The aim of the invention, then, as already mentioned initially, is to remedy such corrosion.

A first method variant is shown diagrammatically in FIG. 3.1 to FIG. 3.6. In a first part of the method (FIG. 3.1 to FIG. 3.3), the component 1 is first provided with a buffer layer 16 formed of Inconel® 182. For this purpose, first (FIG. 3.1), the basic body 13 is stripped off on the end face to such an extent that its end face 15 is set back with respect to the plating 14 or that the plating 14 projects with a projecting length 20 beyond the end face 15 in an axial direction 22. In this case, part of the plating 14 is also stripped off, so that the projecting length 20 has a thickness which is slightly smaller than a thickness 31 of the original plating. In the next step (FIG. 3.2), the buffer layer 16 is applied to the end face 15 in the form of non-illustrated multilayered weld beads, starting at the projecting length 20. The buffer layer thus obtained has a non-uniform end face 23 and on the top side protrudes with a material excess 21 beyond the outside 6 of the component 1. In the next method step, the buffer layer 16 is machined by cutting and its end face 23 is thereby smoothed and stripped off from the outside to such an extent that it is in alignment with the outside 6 of the component 1 (FIG. 3.3). The component 2 is then applied on its end face to the component 1 prepared in this way, so as to leave a weld groove 18 free. A root 25 formed of austenitic material, for example material number 1.4551 or ER 347Si, is welded on between the end face 12 of the component 2 and an end face 24 of the plating 14 (FIG. 3.4). A connection point formed between the two components 1 and 2 by the root 25 is formed of the same material as the plating 14 and the component 2 or of a material comparable thereto, so that, in terms of corrosion, it has the same or similar behavior to the plating 16 and the component 2. Since the welding of an austenitic material to Inconel® tends toward cracks, the root 25 can extend only as far as a separating line 26 between the plating 14 and the buffer layer 16.

In the next method step, an intermediate layer 28 formed of a nickel alloy with 96% nickel, 3% titanium and customary accompanying elements, such as iron, silicon and manganese, as the remainder, is welded onto the outside of the root 25 (FIG. 3.5).

In the last operation (FIG. 3.6), then, a weld seam 19 is applied to the outside of the intermediate layer 28, with Inconel® 82 (DIN 1736 SG-NiCr20Nb or ISO SNi6082) being used as a welding additive. In this, as in all of the other welding operations mentioned herein, welding is carried out under protective gas. This method is largely automated. In this case, a welding wire formed of the welding additive, that is to say, for example, of Inconel® 82, is not delivered to the welding point by hand, but automatically through a corresponding device. In this case, it is critical that delivery takes place at a constantly uniform speed, in such a way that there is always sufficient molten additive present in the region of the welding arc and the molten pool occurring there. If the nickel-based alloy of the weld seam 19 is welded directly onto the austenitic root, that may lead to the formation of cracks. Since welding takes place from the inside outward, a renewal of a cracked root region is possible only at a high outlay, mostly only by separating the connection between the two components 1, 2 again and by beginning the welding of a root 25 once more after complicated preparatory work. It has been shown that, with an intermediate layer 28 of the type mentioned being present, crack formation in the root 25 does not occur. Due to the intermediate layer, the tendency toward crack formation is suppressed because of the more favorable mix ratios with the various materials.

A second method variant is shown in FIG. 4.1 to 4.5. It differs from that described above in a different preparation of the component 1. In contrast to the variant described above, the end face 15 of the basic body 13 is not stripped off first, but instead, the plating 14, although part of the basic body, is also stripped off (FIG. 4.1). The plating 14 is thus set back somewhat with respect to the end face 15, so that a recess 29 is present on the inside 8 of the component 1. The bottom 30 of the recess 29, which is formed by the basic body 13, has a clearance 32 relative to a plane 33 spanned by the inside 8 (the surface of a cylinder in the case of a pipe) which, because of the partial stripping off of the basic body 13 during the removal of the plating 14, is somewhat greater than the thickness 31 of the plating 14. In the next step (FIG. 4.2), an austenitic layer 34 replacing the stripped-off plating 14 is welded into the recess 29 in such a way that this layer protrudes with a material excess 35 beyond the plane 33 spanned by the inside 8. The end face 15 of the basic body 13 is subsequently stripped off to such an extent that a projecting length 36 of the austenitic layer 34 projects beyond it in the axial direction 22 (FIG. 4.3). In this case, part of the region 41 contiguous to the basic body 13 is also stripped off.

In the next processing step (FIG. 4.4), a buffer layer 16 is welded onto the end face 15 of the basic body 13, in a similar way to the method step illustrated in FIG. 3.2 in the method described above. This commences at the projecting length 36. The buffer layer 16 covers the end face 15 completely and is connected in a materially integral manner to the projecting length 36 of the austenitic layer 34. The buffer layer protrudes with a material excess 21 beyond the outside 6 or beyond the plane 39 spanned by the latter. In the next processing step (FIG. 4.5), the material excess 21 of the buffer layer and the material excess 35 of the austenitic layer 34 are stripped off.

The end face 23 of the buffer layer 16 and the end face 37 of the austenitic layer 34 are machined by cutting and are shaped correspondingly to the later weld groove. The component 2 is then welded, in the manner described further above and made clear in FIG. 3.4 to FIG. 3.6, to the component 1 (FIG. 4.5) which is prepared in the manner outlined.

A further method variant (FIG. 5.1 to 5.6) differs from the variants described further above, mainly in the preparation of the component 1. In this case, in a first step, a buffer layer 16 is welded onto the end face 15 of the basic body 13 and is subsequently stripped off and smoothed by cutting machining to such an extent that the buffer layer is in alignment with the outside 6 of the basic body and approximately with a separating line 38 between the basic body 13 and plating 14 (FIG. 5.1). Before the buffer layer 16 is welded on, an end face 24a of the plating 14 is chamfered, so that it forms an angle $\alpha<180°$ pointing away from the buffer layer 16, with the end face 15 of the basic body 13.

In the next method step, another intermediate layer 40 is welded onto the narrow side 17 of the buffer layer 16 (FIG. 5.2). This intermediate layer is formed of a material which is weldable both to the nickel-based alloy of the buffer layer 16 and to an austenitic material. By virtue of this measure, then, it is possible to fill a region 42 circumscribed by the narrow side 17 and the end face 24a, so as to form an austenitic layer 43, by welding the material onto the intermediate layer 40 and in this case also connecting the material to the end face 24a in a materially integral manner. After a cutting machining of the layer 43 for smoothing and shaping, the component 1 is prepared for connection to the component 2 (FIG. 5.3). A material which is suitable for the intermediate layer 40 is, in the first place, a material which may also be used for the intermediate layer 28 (between the root 25 and the weld seam 19) described further above, to be precise an alloy with at least 90% nickel, in particular one which contains 96% nickel, 3% titanium and, as the remainder, accompanying elements, such as iron, silicon and manganese. Such an alloy is known under the ASTM designation ERNI 1. The welding of the component 2 onto the component 1 prepared according to FIG. 5.3 takes place basically in the manner already described further above. In the first step (FIG. 5.4), a root 25 is welded into the weld groove 18, with this root being connected in a materially integral manner to the austenitic layer 43 on the side of the component 1. In this case, as much austenitic material is introduced into the weld groove 18 as is necessary to ensure that, as far as possible, an entire end face 37a of the layer 43 is covered by the root 25 and is thus utilized for the materially integral connection. The root in this case extends at most as far as a separating line 48 between the intermediate layer 40 and the austenitic layer 43. In the next step (FIG. 5.5), the intermediate layer 28 already mentioned is welded onto the outside 27 of the root 25. The intermediate layer 28 is connected on the side of the component 1 to the intermediate layer 40 and has about the same thickness as the latter. In the last method step (FIG. 5.6), finally, the weld seam 18 is generated with Inconel® 82.

As already mentioned, a conventional welded connection with I 182 between two components 1, 2 tends, particularly after lengthy use, toward corrosion upon contact with corresponding media. In the case of advanced corrosion, such a welded connection has heretofore had to be produced completely anew. With the aid of the repair method described below, the welded connection can be renovated at a comparatively low outlay. In the case of pipeline systems, for example the primary circuit of a nuclear power station, manipulator access must, of course, be present in the vicinity of the welded connection, so as not to have to separate the entire welded connection. Manipulator tools and welding robots can then be introduced through this access into the interior of the pipe. Damage 44 (FIG. 6.1) caused by corrosion at a weld seam 19 formed of a nickel-based alloy may, as is seen in the circumferential direction, be limited locally or extend even over the entire inner circumference of the weld seam 19. First, a region containing the damage 44 is copiously stripped off, with the result that a recess 45 is formed (FIG. 6.2). The recess 45 extends in the axial direction 22 into regions 46 of the plating 14 and of the component 2 which are laterally contiguous to the weld seam 19. An intermediate layer 40a, which is formed of the same materials as the intermediate layer 40 mentioned further above, is then applied to the bottom 49 of the recess 45 (FIG. 6.3). The intermediate layer 40a covers the bottom 49 of the recess 45 completely. Finally, a closing layer 50 formed of austenitic material, for example AISI 347, is welded onto the intermediate layer 40a so as to cover the entire area. Non-illustrated material protruding beyond the insides 8, 9 after the welding operation is subsequently stripped off in such a way that an inside 47 of the closing layer 50 is in alignment with the insides 8 and 9 of the respective components 1 and 2.

The invention claimed is:

1. A method for producing a welded connection between first and second components each having a respective inside, outside and end face interconnecting the inside and the outside, the first component being formed of a ferritic basic body carrying an inside plating and having an end face provided with a buffer layer formed of a nickel-based welding material, and the second component being formed of an austenitic material, the method comprising the following steps:
   a) enclosing a weld groove between the end faces of the two components;
   b) connecting only the plating to the end face of the second component with a root formed of an austenitic material welded in the weld groove;
   c) welding an intermediate layer formed of a nickel alloy with at least 90% nickel onto the root, onto an end face of the plating, and onto the end face of the second component; and
   d) subsequently generating a weld seam with a nickel-based welding material in the weld groove still remaining.

2. The method according to claim 1, which further comprises producing the buffer layer on the first component by the following steps:
   a) stripping off the end face of the basic body of the first component to cause the plating to project beyond the end face of the basic body with a projecting length;
   b) welding the buffer layer onto the end face of the basic body and completely covering the end face of the basic body with the buffer layer, the buffer layer being connected to the projecting length;
   c) heat-treating the first component in vicinity of the buffer layer to break down material stresses having occurred during welding on of the buffer layer; and
   d) smoothing a surface of the buffer layer by cutting machining.

3. The method according to claim 1, which further comprises applying the buffer layer to the first component by the following steps:
   a) stripping off a region of the plating contiguous to the end face of the basic body to create a recess;
   b) welding a layer formed of austenitic material into the recess to form an austenitic replacement layer projecting with a material excess beyond the inside of the component;

c) stripping off the end face of the basic body to cause the austenitic replacement layer to project beyond the end face of the basic body with a projecting length;

d) welding the buffer layer completely covering the end face of the basic body, being connected to the projecting length of the austenitic replacement layer and being formed of a nickel-based welding additive, onto the end face of the basic body;

e) heat-treating the first component in vicinity of the buffer layer to break down material stresses having occurred during welding on of the buffer layer; and f) smoothing the buffer layer on the end face of the basic body by cutting machining, and stripping off the austenitic replacement layer to a thickness corresponding to the plating.

4. The method according to claim 1, which further comprises producing the buffer layer on the first component by the following steps:

a) welding the buffer layer completely covering the end face of the basic body onto the end face of the basic body;

b) smoothing an end face and a narrow side of the buffer layer facing the inside of the component, by cutting machining;

c) welding another intermediate layer, formed of a material weldable both to the nickel-based alloy of the buffer layer and to an austenitic material, onto an entire area of the narrow side;

d) welding an austenitic layer onto the other intermediate layer to protrude beyond the end face of the basic body and beyond the inside of the component; and e) smoothing the austenitic layer by cutting machining and stripping off a surface of the austenitic layer facing away from the other intermediate layer into alignment with the inside of the component.

5. The method according to claim 4, which further comprises selecting a material for the other intermediate layer containing 10 to 40% Ni, 10 to 30% Cr, 1 to 10% Mn, 0.1 to 0.3% Si and 0.01 to 0.4% C.

6. The method according to claim 5, wherein the material for the other intermediate layer additionally contains 0.1 to 0.3% N and 2 to 6% Mo.

7. The method according to claim 5, wherein the material for the other intermediate layer additionally contains 1 to 3% Nb.

8. The method according to claim 1, which further comprises selecting the nickel alloy for the intermediate layer containing 95 to 98% Ni.

9. The method according to claim 1, which further comprises providing ISO SNi6082 as a welding material for the weld seam.

* * * * *